US012719053B2

(12) United States Patent
Liu et al.

(10) Patent No.: US 12,719,053 B2
(45) Date of Patent: Aug. 25, 2026

(54) POSITIVE ELECTRODE MATERIAL, ELECTROCHEMICAL DEVICE, AND ELECTRICAL DEVICE

(71) Applicant: Ningde Amperex Technology Limited, Ningde City (CN)

(72) Inventors: Wenyuan Liu, Ningde City (CN); Feng Gu, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 629 days.

(21) Appl. No.: 18/129,392

(22) Filed: Mar. 31, 2023

(65) Prior Publication Data

US 2023/0238528 A1 Jul. 27, 2023

Related U.S. Application Data

(63) Continuation of application No. PCT/CN2021/071478, filed on Jan. 13, 2021.

(51) Int. Cl.

*H01M 4/525* (2010.01)
*C01G 53/42* (2025.01)
*C01G 53/50* (2025.01)
*H01M 4/131* (2010.01)
*H01M 4/505* (2010.01)
*H01M 10/0525* (2010.01)
*H01M 4/02* (2006.01)

(52) U.S. Cl.

CPC ............ *H01M 4/525* (2013.01); *C01G 53/42* (2013.01); *C01G 53/50* (2013.01); *H01M 4/131* (2013.01); *H01M 4/505* (2013.01); *H01M 10/0525* (2013.01); *H01M 2004/021* (2013.01); *H01M 2004/028* (2013.01)

(58) Field of Classification Search

None

See application file for complete search history.

(56) References Cited

U.S. PATENT DOCUMENTS 10,727,530 B2 7/2020 Matsushita et al.
2012/0036321 A1 2/2012 Zwisler et al.
2015/0093580 A1 4/2015 Kobayashi et al.
2015/0311522 A1 10/2015 Fang et al.
2018/0287202 A1 10/2018 Matsushita et al.
2021/0313563 A1* 10/2021 Guo ...................... H01M 4/364
2021/0367236 A1* 11/2021 Liu ...................... H01M 4/485

FOREIGN PATENT DOCUMENTS

CN 108431998 A 8/2018
CN 110416511 A 11/2019
CN 110429252 A 11/2019
CN 111201649 A 5/2020
CN 111384372 A 7/2020
JP 2000243394 A 9/2000
JP 2018-142402 A 9/2018
JP 2020-129498 A 8/2020
WO 2020/067795 A1 4/2020

OTHER PUBLICATIONS

Office Action dated Jun. 27, 2022, issued in counterpart CN application No. 202180003796.4. (6 pages).
International Search Report dated Octeober 15, 2021, issued in counterpart application No. PCT/CN2021/071478 with English translation. (6 pages).
Notice of Allowance dated Aug. 4, 2023, issued in counterpart CN Application No. 202180003796.4. (4 pages).
Extended (Supplementary) European Search Report dated Nov. 27, 2024, issued in counterpart EP Application No. 21918259.9. (5 pages).
Notice of Allowance dated Nov. 3, 2025, issued in counterpart CN Application No. 202311359902.X. (4 pages).

* cited by examiner

*Primary Examiner* — Carlos Barcena
(74) *Attorney, Agent, or Firm* — WHDA, LLP

(57) ABSTRACT

A positive electrode material includes a first powder. The first powder includes first secondary particles. The first secondary particles includes at least two first primary particles. An average particle diameter D1 of the first primary particles is 500 nm to 3 μm. An average particle diameter D2 of the first secondary particles is 2 μm to 8 μm. A ratio K1 of D2 to D1 satisfies: $2 \leq K1 \leq 10$. The first powder includes an element Co and optionally further includes a metal element M. The metal element M includes at least one of Mn, Al, W, Ti, Zr, Mg, La, Y, Sr, or Ce. A molar ratio R1 between Co and M is greater than or equal to 5. The positive electrode material achieves relatively high rate performance and safety on the basis of achieving a relatively high energy density.

16 Claims, No Drawings

POSITIVE ELECTRODE MATERIAL, ELECTROCHEMICAL DEVICE, AND ELECTRICAL DEVICE

CROSS REFERENCE TO RELATED APPLICATIONS

This application is a continuation application of International Application No. PCT/CN2021/071478, filed on Jan. 13, 2021, the contents of which are incorporated herein by reference in its entirety.

TECHNICAL FIELD

This application relates to the field of energy storage, and in particular, to a positive electrode material, an electrochemical device, and an electrical device.

BACKGROUND

With the development of electric vehicle and energy storage industries, higher requirements are imposed on secondary batteries. The secondary batteries are required to have excellent performance such as cost efficiency, a high energy density, a long cycle life, and a high power density. In a lithium-ion battery, a high-nickel positive electrode material is favored by the electrical tool market due to cost efficiency and a high energy density. However, the high-nickel positive electrode material incurs problems such as a low compressed density, inferior rate performance, fast temperature rise, and severe gassing. In an existing battery containing a high-nickel positive electrode material, in order to increase the energy density of the high-nickel material, a particle size of the high-nickel positive electrode material is usually made very small to improve the compacted density of the high-nickel positive electrode material, or a nickel content in the high-nickel positive electrode material is increased to 95% or above. This will reduce the rate performance of the high-nickel material, and aggravate the gassing of the high-nickel material, thereby reducing safety performance of a lithium-ion battery.

SUMMARY

A first objective of this application is to disclose a positive electrode material to solve the problems of low rate performance, severe gassing, and low safety of a battery when an existing high-nickel positive electrode material achieves a high energy density.

A second objective of this application is to disclose an electrochemical device to improve the capacity, rate performance, and safety of the electrochemical device.

A third objective of this application is to disclose an electrical device to improve safety of the electrical device.

To fulfil the objectives of this application, a technical solution put forward is: This application relates to a positive electrode material. The positive electrode material includes a first powder. The first powder includes first secondary particles. The first secondary particles includes at least two first primary particles. An average particle diameter D1 of the first primary particles is 500 nm to 3 μm. An average particle diameter D2 of the first secondary particles is 2 μm to 8 μm. A ratio K1 of D2 to D1 satisfies: 2≤K1≤10.

Further, the first powder includes an element Co and optionally further includes a metal element M. The metal element M includes at least one of Mn, Al, W, Ti, Zr, Mg, La, Y, Sr, or Ce. A molar ratio R1 between Co and M is greater than or equal to 5.

In the positive electrode material according to embodiments of this application, by controlling the size of the first secondary particles and the size of the first primary particles and a ratio between the two sizes, and by controlling the molar ratio between Co and other metal elements M in the positive electrode material, this application can improve the rate performance of the positive electrode material on the basis of maintaining a relatively high capacity of the positive electrode material. In addition, the cycle capacity retention rate at the time of gassing of the positive electrode material is lower, so as to improve safety performance of the positive electrode material.

Further, a molar ratio R1 between the element Co and the metal element M in the first powder satisfies: 11≤R1≤200.

Further, the first powder includes a lithium transition metal composite oxide. Components of the first powder further include elements Li and Ni. A molar percent of the element Li is nu, a molar percent of the element Ni is $n_{Ni}$, a molar percent of the element Co is $n_{Co}$, a molar percent of the element M is $n_M$, a sum of the molar percent of the elements Ni, Co, M is $n_{Ni+Co+M}$, and at least one of the following conditions is satisfied: (1) a ratio of $n_L$ to $n_{Ni+Co+M}$ is 0.85≤n1<1.1; (2) a ratio of $n_{Ni}$ to $n_{Ni+Co+M}$ is 0.5≤x1<1; (3) a ratio of $n_{Co}$ to $n_{Ni+Co+M}$ is 0.01≤y1<0.5; and (4) a ratio of $n_M$ to $n_{Ni+Co+M}$ is 0≤z1≤0.02.

Further, the components of the first powder include $Li_{n1}Ni_{x1}Co_{y1}M_{z1}O_{2\pm m1}$, where 0.85≤n1<1.1, 0.5≤x1<1, 0.01≤y1<0.5, 0≤z1≤0.02, x1+y1+z1=1, and 0≤m1≤0.1.

Further, the metal element M includes Al. A molar ratio N1 between the element Al and a transition metal element in the first powder satisfies: 0%≤B1≤0.1%.

Further, the metal element M includes Mn. A molar ratio between the element Mn and a transition metal element in the first powder is less than 0.5%.

Further, a surface of a first secondary particle contains a coating layer. The coating layer includes an element Z. The element Z includes at least one of Al, W, Ti, Zr, B, P, or F. A molar ratio between the element Z and a transition metal element in the first powder is less than or equal to 0.5%.

Further, the positive electrode material includes a second powder. The second powder includes a second secondary particle. The second secondary particle includes at least two second primary particles. An average particle diameter D3 of the second primary particles is 300 nm to 800 nm, an average particle diameter D4 of the second secondary particle is 8 μm to 15 μm, and a ratio K2 of D4 to D3 satisfies: 15≤K2≤30.

Further, the second powder includes an element Co and a metal element M. A molar ratio R2 between the element Co and the metal element M in the second powder is 0.1 to 5.

Further, the second powder includes a lithium transition metal composite oxide. Components of the second powder further include elements Li and Ni. A molar percent of the element Li is $n_{Li}$, a molar percent of the element Ni is $n_{Ni}$, a molar percent of the element Co is $n_{Co}$, a molar percent of the element M is $n_M$, a sum of the molar percent of the elements Ni, Co, M is $n_{Ni+Co+M}$, and at least one of the following conditions is satisfied: (a) a ratio of $n_{Li}$ to $n_{Ni+Co+M}$ is 0.85≤n2<1.1; (b) a ratio of $n_{Ni}$ to $n_{Ni+Co+M}$ is 0.5≤x2<1; (c) a ratio of $n_{Co}$ to $n_{Ni+Co+M}$ is 0.01≤y2≤0.49; and (d) a ratio of $n_M$ to $n_{Ni+Co+M}$ is 0.01≤z2≤0.5.

Further, the components of the second powder include $Li_{n2}Ni_{x2}Co_{y2}M_{z2}O_{2\pm m2}$, where 0.85≤n2<1.1, 0.5≤x2<1, 0.01≤y2≤0.49, 0.01≤z2≤0.5, x2+y2+z2=1, and 0≤m2≤0.1.

Further, the second powder includes at least one of B or Al, where a ratio of a total molar weight of B and Al to a molar weight of a transition metal element in the second powder is 0.1% to 0.5%.

Further, a weight of the first powder is 15% to 60% of a total weight of the first powder and the second powder.

This application further relates to an electrochemical device, including the positive electrode material according to this application.

The electrochemical device according to this application exhibits the advantages of high rate performance and high safety performance on the basis of maintaining a relatively high energy density.

This application further relates to an electrical device, including the electrochemical device according to this application.

The electrical device according to this application can obtain a better supply of power and achieve higher safety and reliability.

This application is further described below with reference to specific embodiments. Understandably, the embodiments are merely intended to illustrate this application but not to limit the scope of this application. Formulas, ratios, and percentages in the embodiments may be selected according to actual conditions without causing any substantive impact on the results.

DETAILED DESCRIPTION

The following describes in detail a positive electrode material, a secondary battery, and an electrical device according to this application.

In a first aspect, an embodiment of this application provides a positive electrode material. The positive electrode material includes a first powder. The first powder includes first secondary particles. The first secondary particles includes at least two first primary particles. An average particle diameter D1 of the first primary particles is 500 nm to 3 μm. An average particle diameter D2 of the first secondary particles is 2 μm to 8 μm. A ratio K1 of D2 to D1 satisfies: $2 \leq K1 \leq 10$. The first powder includes an element Co and optionally further includes a metal element M. The metal element M includes at least one of Mn, Al, W, Ti, Zr, Mg, La, Y, Sr, or Ce. A molar ratio R1 between Co and M is greater than or equal to 5.

The metal element M may be selectively added, and the added metal element M is configured to improve cycle performance of the positive electrode material. However, the doping percent of the metal element M needs to avoid being too high. For example, when R1 is greater than 5, the capacity retention rate of the electrochemical device containing such a positive electrode material still keeps at a relatively high level when the gassing amount reaches a critical level. Therefore, consumers still reuse such an electrochemical device repeatedly, and safety hazards are caused by the continuous gassing. By controlling the molar ratio R1 between Co and M to be greater than or equal to 5, this application can ensure that the capacity retention rate of the electrochemical device at the time of the gassing amount reaching a critical level is already relatively low, for example, lower than 90% in some embodiments, or, in other embodiments, lower than 80%. In this way, a management system of the electrochemical device can remind in time, based on the capacity retention rate, the consumers to replace the electrochemical device, so as to avoid repeated use of such an electrochemical device when the gassing amount reaches a critical level, and in turn, improve safety performance.

In the positive electrode material according to this embodiment of this application, by controlling the size of the first secondary particles and the size of the first primary particles and a ratio between the two sizes, and by controlling the molar ratio between Co and other metal elements M in the positive electrode material, this application can improve the rate performance of the positive electrode material on the basis of maintaining a relatively high capacity of the positive electrode material. In addition, the cycle capacity retention rate at the time of gassing of the positive electrode material is lower, so as to improve safety performance of the positive electrode material.

It is hereby noted that, the first secondary particles in this embodiment of this application is formed of the first primary particles. The particle size of the first primary particles is relatively small. In addition, the first secondary particles is formed by agglomerating the first primary particles.

The lower limit of the average particle diameter D1 of the first primary particles is typically, but not limited to, 500 nm, 520 nm, 550 nm, 570 nm, 580 nm, 600 nm, 610 nm, 630 nm, 650 nm, 680 nm, or higher. An upper limit of the average particle size D1 of the first primary particles is typically, but not limited to, 3 μm, 2.8 μm, 2.5 μm, 23 μm, 2.1 μm, 2 μm, 1.8 μm, 1.7 μm, 1.5 μm, 1.3 μm, 1.1 μm, 1 μm, or lower.

A lower limit of the average particle diameter D2 of the first secondary particles is typically, but not limited to, 2 μm, 2.2 μm, 2.5 μm, 2.7 μm, 2.8 μm, 3 μm, 3.2 μm, or higher. An upper limit of the average particle size D2 of the first secondary particles is typically, but not limited to, 8 μm, 7.8 μm, 7.5 μm, 7.3 μm, 7.1 μm, 6 μm, 6.8 μm, 6.7 μm, 6.5 μm, 6.3 μm, 6.1 μm, 6 μm, or lower.

A ratio K1 of the average particle diameter D2 of the first secondary particles to the average particle size D1 of the first primary particles is typically, but not limited to, 2, 3, 4, 5, 6, 7, 8, 9, or 10, for example.

The molar ratio R1 between the element Co and the metal element M is typically, but not limited to, 5, 6, 8, 10, 15, 18, 20, 22, 24, 26, 28, 30, or higher, for example.

In some embodiments of this application, the molar ratio R1 between the element Co and the metal element M in the first powder satisfies: $11 \leq R1 \leq 500$. The upper limit of the molar ratio R1 between the element Co and the metal element M is typically, but not limited to, 500, 480, 460, 440, 420, 400, 380, 350, or higher, and so on.

In some embodiments of this application, the first powder includes a lithium transition metal composite oxide. Components of the first powder further include elements Li and Ni. A molar percent of the element Li is $n_{Li}$, a molar percent of the element Ni is $n_{Ni}$, a molar percent of the element Co is $n_{Co}$, a molar percent of the element M is $n_M$, a sum of the molar percent of the elements Ni, Co, M is $n_{Ni+Co+M}$, and at least one of the following conditions is satisfied: (1) a ratio of $n_{Li}$ to $n_{Ni+Co+M}$ is $0.85 \leq n1 < 1.1$; (2) a ratio of $n_{Ni}$ to $n_{Ni+Co+M}$ is $0.5 \leq x1 < 1$; (3) a ratio of $n_{Co}$ to $n_{Ni+Co+M}$ is $0.01 \leq y1 < 0.5$; and (4) a ratio of nm to $n_{Ni+Co+M}$ is $0 \leq z1 \leq 0.02$.

When the ratio D2/D1 of the average particle diameter of the first secondary particles to the average particle diameter of the first primary particle satisfies $2 \leq K1 \leq 10$, and the molar ratio R1 between Co and M is greater than or equal to 5, the weight percent of Li, Ni, Co, and metal element M in the first powder can be controlled to further improve the energy density and cycle stability of the battery. By controlling the weight percent of Ni to satisfy $0.5 \leq x1 < 1$, the battery containing the positive electrode material achieves both a high capacity and high rate performance concurrently.

In some embodiments of this application, the components of the first powder include $Li_{n1}Ni_{x1}Co_{y1}M_{z1}O_{2\pm m1}$, where $0.85 \le n1 < 1.1$, $0.5 \le x1 < 1$, $0.01 \le y1 < 0.5$, $0 \le z1 \le 0.02$ $x1+y1+z1=1$, and $0 \le m1 \le 0.1$.

In some embodiments of this application, the metal element M includes Al. A molar ratio N1 between the element Al and a transition metal element in the first powder satisfies: $0.1\% \le N1 \le 0.5\%$.

In some embodiments of this application, the metal element M includes Mn. A molar ratio between the element Mn and a transition metal element in the first powder is less than 0.5%.

The doping elements Al and Mn can suppress gassing more effectively and improve the cycle performance and thermal stability of the lithium-ion battery.

In some embodiments of this application, a surface of a first secondary particle contains a coating layer. The coating layer includes an element Z. The element Z includes at least one of Al, W, Ti, Zr, B, P, or F. A molar ratio between the element Z and a transition metal element in the first powder is less than or equal to 0.5%.

By disposing a coating layer on the surface of a first secondary particle and controlling the content of the element Z, this application can, on the basis of enhancing the cycle performance, ensure that the capacity retention rate of the battery containing the positive electrode material keeps at a low level during gassing, thereby ensuring safety performance.

In some embodiments of this application, the positive electrode material includes a second powder. The second powder includes a second secondary particle. The second secondary particle includes at least two second primary particles. An average particle diameter D3 of the second primary particles is 300 nm to 800 nm, an average particle diameter D4 of the second secondary particle is 8 μm to 15 μm, and a ratio K2 of D4 to D3 satisfies: $15 \le K2 \le 30$.

By doping with the second powder, and by specifying the particle sizes of the second secondary particle and the second primary particles in the second powder, this application can further improve the capacity and rate performance of the positive electrode material.

In some embodiments of this application, the second powder includes an element Co and a metal element M. A molar ratio R2 between the element Co and the metal element M in the second powder is 0.1 to 5. The second powder with R2 being less than or equal to 5 achieves higher cycle performance, but R2 needs to be great enough. When R2 is less than 0.1, the capacity and rate performance of the material will decline.

By specifying the molar ratio between Co and the metal element M in the second powder, this application can further improve the capacity and cycle performance of the positive electrode material. In the second powder, the lower limit of the molar ratio R2 between the element Co and the metal element M is typically, but not limited to, 0.1, 0.2, 0.5, 0.6, 0.8, 1.0, 1.2, 1.3, 1.5, 1.8, or higher, for example. The upper limit of R2 is typically, but not limited to 5, 4.8, 4.6, 4.4, 4.2, 4.0, 3.8, 3.6, 3.4, 3.2, or lower, for example.

In some embodiments of this application, components of the second powder further include elements Li and Ni. A molar percent of the element Li is $n_{Li}$, a molar percent of the element Ni is $n_{Ni}$, a molar percent of the element Co is $n_{Co}$, a molar percent of the element M is $n_M$, a sum of the molar percent of the elements Ni, Co, M is $n_{Ni+Co+M}$, and at least one of the following conditions is satisfied: (a) a ratio of $n_{Li}$ to $n_{Ni+Co+M}$ is $0.85 \le n2 < 1.1$; (b) a ratio of $n_{Ni}$ to $n_{Ni+Co+M}$ is $0.5 \le x2 < 1$; (c) a ratio of $n_{Co}$ to $n_{Ni+Co+M}$ is $0.01 \le y2 \le 0.49$; and (d) a ratio of $n_M$ to $n_{Ni+Co+M}$ is $0.01 \le z2 \le 0.5$.

As an illustrative description, in some embodiments of this application, the components of the second powder include $Li_{n2}Ni_{x2}Co_{y2}M_{z2}O_{2\pm m2}$, where $0.85 \le n2 < 1.1$, $0.5 \le x2 < 1$, $0.01 \le y2 \le 0.49$, $0.01 \le z2 \le 0.5$, $x2+y2+z2=1$, and $0 \le m2 \le 0.1$.

In some embodiments of this application, the second powder includes at least one of B or Al. A ratio of a total molar weight of B and Al to a molar weight of a transition metal element in the second powder is 0.1% to 0.5%. The element B can improve the capacity of the material on the basis of improving the cycle performance. The element Al can improve the cycle performance and rate performance.

In some embodiments of this application, a weight of the first powder is 15% to 60% of a total weight of the first powder and the second powder.

By optimizing the weight percent of the first powder, this application can balance the energy density, rate performance, and gassing suppression performance of the positive electrode material, and improve the comprehensive performance of the obtained positive electrode material.

As an illustrative description, the first secondary particles and the second secondary particles in the electrochemical device can be obtained in the following steps:

Step S1: Discharging the electrochemical device until a fully discharged state, and disassembling the electrochemical device to obtain a positive electrode plate.

Step S2: Immersing the positive electrode plate in an N-methyl-pyrrolidone (NMP) solution for 24 hours, and calcining for 5 hours in a 500° C. air atmosphere.

Step S3: Scraping off a positive active material layer from the calcined positive electrode plate without reaching the positive current collector.

Step S4: Grinding the obtained positive electrode material powder evenly, and passing the powder through a 400-mesh sieve.

Step S5: Collecting the powder that has passed through the 400-mesh sieve, so as to obtain a positive material powder.

Step S6: Dispersing the positive electrode material powder in the NMP solution evenly, ultrasonically dispersing for 12 hours, and stirring well to obtain a suspension containing the positive electrode material powder.

Step S7 Pouring the suspension into a 1500-mesh sieve slowly, passing a part of small particles through the sieve to form a filtrate, and drying the filtrate to obtain a powder used as the first powder according to this application. Another part of large particles remain on the sieve, and are dried to obtain a second powder according to this application.

The steps above are performed in a drying room with a relative humidity of less than 2%.

According to a second aspect, an embodiment of this application provides an electrochemical device. The electrochemical device includes the positive electrode material according to some embodiment in the first aspect of this application.

The electrochemical device according to this embodiment of this application may be any device in which an electrochemical reaction occurs. Specific examples of the electrochemical device include, but are not limited to, all kinds of primary batteries, secondary batteries, or capacitors. In particular, the electrochemical device may be a lithium secondary battery, including a lithium metal secondary battery, a lithium-ion secondary battery, a lithium polymer secondary battery, or a lithium-ion polymer secondary battery. The electrochemical device includes a positive electrode, a negative electrode, and a separator disposed between the positive electrode and the negative electrode.

The electrochemical device may be a lithium-ion battery. The lithium-ion battery includes a positive electrode containing a positive electrode material, a negative electrode containing a negative electrode material, an electrolyte, and a separator located between the positive electrode and the negative electrode. The positive electrode material is the positive electrode material according to the first aspect of this application. The positive electrode material may be spread on the positive current collector to form a positive electrode. The negative electrode material may be spread on a surface of the negative current collector to form a negative electrode. The positive current collector may be an aluminum foil or nickel foil, and the negative current collector may be a copper foil or nickel foil.

The negative electrode material can absorb and release lithium (hereinafter sometimes referred to as "negative electrode material capable of absorbing/releasing lithium"). Examples of the negative electrode material capable of absorbing/releasing lithium may include a carbon material, a metal compound, an oxide, a sulfide, a lithium nitride such as $LiN_3$, a lithium metal, a metal alloyed with lithium, and a polymer material.

Examples of the carbon material may include low-graphitization carbon, easily graphitizable carbon, artificial graphite, natural graphite, mesocarbon microbead, soft carbon, hard carbon, pyrolytic carbon, coke, glassy carbon, an organic polymer compound sintered body, carbon fibers, and activated carbon. The coke may include pitch coke, needle coke, and petroleum coke. The organic polymer compound sintered body means a material obtained by calcining a polymer material such as phenol plastic or furan resin at an appropriate temperature until carbonization. Some of the obtained material is classed into low-graphitization carbon and easily graphitizable carbon. Examples of the polymer material may include polyacetylene and polypyrrole.

Among the negative electrode materials capable of absorbing/releasing lithium, a material with charge and discharge voltages close to the charge and discharge voltages of the lithium metal is selected. That is because, the lower the charge and discharge voltages of the negative electrode material, the more easily the lithium-ion battery can achieve a higher energy density. A carbon material may be selected as the negative electrode material. Because a crystal structure of the carbon material changes just a little during charging and discharging, the carbon material helps to achieve excellent cycle performance and a high charge capacity and discharge capacity. For example, graphite is selected because graphite provides a large electrochemical equivalent and a high energy density.

In addition, the negative electrode materials capable of absorbing/releasing lithium may include simple-substance lithium metal, a metal element or semi-metal element alloyable with lithium, an alloy or compound containing such element, and the like. For example, the negative electrode materials are used together with a carbon material, so as to achieve excellent cycle characteristics and a high energy density. The alloy used herein may be an alloy that contains two or more metal elements, or may be an alloy that contains one or more metal elements and one or more semi-metal elements. The alloy may be in one of the following states: solid solution, eutectic crystal, intermetallic compound, and a mixture thereof.

Examples of the metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (H). Examples of the alloy and compound may include a material represented by a chemical formula $Ma_sMb_tLi_u$ and a material represented by a chemical formula $Ma_pMc_qMd_r$. In such chemical formulas, Ma represents at least one element among the metal elements and semi-metal elements that can combine with lithium to form an alloy; Mb represents at least one element among the metal elements and semi-metal elements other than lithium and Ma; Me represents at least one element among non-metal elements; Md represents at least one element among the metal elements and semi-metal elements other than Ma; and s, t, u, p, q, and r satisfy $s>0$, $t\geq0$, $u\geq0$, $p>0$, $q>0$, and $r\geq0$.

The separator of the lithium-ion battery includes, but is not limited to, at least one of polyethylene, polypropylene, polyethylene terephthalate, polyimide, or aramid. For example, the polyethylene includes a component selected from at least one of high-density polyethylene, low-density polyethylene, and ultra-high-molecular-weight polyethylene. Especially, the polyethylene and the polypropylene are highly effective in preventing short circuits, and can improve stability of the battery through a turn-off effect.

A porous layer may be further included on a surface of the separator. The porous layer is disposed on at least one surface of the separator. The porous layer includes one or both of an inorganic particle and a binder. The inorganic particle is one or more selected from aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. The binder is one or more selected from polyvinylidene fluoride, vinylidene fluoride-hexafluoropropylene copolymer, polyamide, polyacrylonitrile, polyacrylate, polyacrylic acid, polyacrylate, sodium carboxymethyl cellulose, polyvinylpyrrolidone, polyvinyl ether, poly methyl methacrylate, polytetrafluoroethylene, and polyhexafluoropropylene.

The porous layer can improve heat resistance and oxidation resistance of the separator, and infiltration performance of the electrolytic solution, and enhance adhesivity between the separator and the positive electrode plate or negative electrode plate.

The lithium-ion battery further includes an electrolyte. The electrolytic solution includes a compound containing at least 2 cyano groups. The electrolyte may be one or more of a gel electrolyte, a solid-state electrolyte, or an electrolytic solution. The electrolytic solution includes a lithium salt and a nonaqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, the lithium salt is $LiPF_6$ because it provides a high ionic conductivity and improves cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the chain carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (EMC), or any combination thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof.

Examples of the carboxylate compound are methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, methyl formate, or any combination thereof.

Examples of the ether compound are dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or any combination thereof.

The following further describes the positive electrode material in this application with reference to embodiments and comparative embodiments, and describes the performance of the positive electrode material in this application by using a lithium-ion battery.

Preparing a positive electrode plate: Mixing well the positive electrode material obtained in the following example, conductive carbon black as a conductive agent, and polyvinylidene difluoride as a binder at a weight ratio of 97:1.5:1.5 in an N-methyl-pyrrolidone (NMP) solvent system to form a positive slurry. Coating an aluminum foil with the positive slurry, and performing drying, cold calendering, and cutting to obtain a positive electrode plate.

Preparing a negative electrode plate: Mixing artificial graphite, styrene butadiene rubber, and sodium carboxymethyl cellulose at a weight ratio of 96:2:2, dispersing the mixture in deionized water, and mixing well to form a negative slurry. Coating a copper foil with the negative slurry, and performing drying, cold calendering, and cutting to obtain a negative electrode plate.

Preparing a separator: Using a polyethylene porous polymer film as a separator.

Preparing an electrolytic solution: Mixing lithium hexafluorophosphate (1.15 mol/L) with a nonaqueous organic solvent in an environment in which a moisture content is less than 10 ppm, where the nonaqueous organic solvent is a product of mixing ethylene carbonate (EC), propylene carbonate (PC), and diethyl carbonate (DEC) at a weight ratio of 1:1:1. Mixing well to obtain an electrolytic solution.

Preparing a lithium-ion battery: Stacking the positive electrode plate, the separator, and the negative electrode plate sequentially in such a way that the separator is located between the positive electrode and the negative electrode to serve a function of separation, and winding the stacked materials to obtain an electrode assembly. Putting the electrode assembly in an aluminum plastic film outer package, dehydrating the electrode assembly at 80° C., injecting the foregoing electrolytic solution, and sealing the package. Performing steps such as chemical formation, degassing, and shaping to obtain a lithium-ion battery.

The test items and test methods of the positive electrode material and the lithium-ion battery are described below.

1. Method for measuring the particle sizes of the primary particles (including a first primary particle and a second primary particle) and secondary particles (including a first secondary particle and a second secondary particle)

Using the primary particles as an example, the average particle diameter of the primary particles mentioned in this application is determined by imaging in a scanning electron microscope (ZEISS Sigma-02-33, Germany). Spreading out a specimen on a specimen holder. Taking images of different regions of the specimen with the scanning electron microscope. Running image parser software to select randomly, from an SEM image, 20 primary particles that are complete in shape and not obstructed. Determining the area of each primary particle. Subsequently, assuming that the primary particles are spherical, and determining the particle diameter R of each particle by the following formula: $R=2\times(S/\pi)^{1/2}$, where S is the area of the primary particle. Determining the particle diameters R of such primary particles of five SEM images, and arithmetically averaging the particle diameters of the obtained 100 (=20×5) primary particles to determine the average particle diameter of the primary particles.

The method for measuring the particle diameter of the secondary particles is the same as the method for measuring the particle diameter of the primary particles.

2. Testing the Cycle Capacity Retention Rate and Cycle Gassing:

Putting a lithium-ion battery in a 45° C±2° C. thermostat, and leaving the battery to stand for 2 hours. Charging the battery at a constant current of 1.5 C until the voltage reaches 4.25 V, and then charging the battery at a constant voltage of 4.25 V until the current reaches 0.02 C, and leaving the battery to stand for 15 minutes. Discharging the battery at a constant current of 4.0 C until the voltage reaches 2.8 V, thereby completing one charge-and-discharge cycle. Recording a discharge capacity of the lithium-ion battery in the first cycle. Subsequently, repeating the foregoing charge-and-discharge process for 500 cycles, and recording the discharge capacity at the end of the $500^{th}$ cycle.

Taking 4 lithium-ion batteries for each group, and calculating an average value of the capacity retention rates of the lithium-ion batteries. Cycle capacity retention rate of a lithium-ion battery=($n^{th}$-cycle discharge capacity (mAh)/first-cycle discharge capacity (mAh)×100%.

Determining the capacity retention rate C from which the gassing obviously starts to occur: The capacity retention rate C from which the gassing obviously starts to occur is a capacity retention rate measured when (Hc−Hd)/Hd is greater than or equal to 2%, where He is the maximum thickness of the lithium-ion battery at the end of the charging step, and Hd is the thickness of the maximum-thickness position at the end of the discharging step in a charge-and-discharge cycle.

3. Testing the Rate Performance

Putting a lithium-ion battery in a 25° C.±2° C. thermostat, and leaving the battery to stand for 2 hours. Charging the battery at a constant current of 0.2 C until the voltage reaches 4.25 V, and then charging the battery at a constant voltage of 4.25 V until the current reaches 0.02 C, and leaving the battery to stand for 15 minutes. Discharging the battery at a constant current of 0.2 C and 8 C separately until the voltage reaches 2.8 V. 8 C rate retention rate=8 C discharge capacity/0.2 C discharge capacity×100%.

Embodiment 1

Mixing the $Ni_{0.88}Co_{0.12}(OH)_2$ precursor with LiOH at a molar ratio of Li/(Ni+Co)=1.03. Performing first-time calcination at 840° C. for 20 hours, and pulverizing, sifting, and rinsing the calcined product in sequence to obtain a first powder. In the process of pulverizing, sifting, and rinsing, the parameters are controlled so that the particle diameter D1 of the first primary particles in the obtained first powder is 1.7 μm, and the particle diameter D2 of the first secondary particles is 3.7 μm.

Embodiment 2

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.001. D1 in the first powder is 1.8 μm, and D2 is 3.7 μm.

Embodiment 3

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 1.7 μm, and D2 is 3.8 μm.

Embodiment 4

Differences from Embodiment 1 are: Mixing the $Ni_{0.88}Co_{0.115}Mn_{0.005}(OH)_2$ precursor, the LiOH, and the $ZrO_2$ at a molar ratio of Li/(Ni+Co+Mn+Zr)=1.03 and a molar ratio of Zr/(Ni+Co+Mn+Zr)=0.003. D1 in the first powder is 1.8 μm, and D2 is 3.7 μm.

Embodiment 5

Differences from Embodiment 1 are: Mixing the $Ni_{0.88}Co_{0.11}Mn_{0.01}(OH)_2$ precursor, the LiOH, and the $ZrO_2$ at a molar ratio of Li/(Ni+Co+Mn+Zr)=1.03 and a molar ratio of Zr/(Ni+Co+Mn+Zr)=0.003. D1 in the first powder specimen is 1.7 μm, and D2 is 3.7 μm.

Embodiment 6

Differences from Embodiment 1 are: Mixing the $Ni_{0.88}Co_{0.105}Mn_{0.015}(OH)_2$ precursor, the LiOH, and the $ZrO_2$ at a molar ratio of Li/(Ni+Co+Mn+Zr)=1.03 and a molar ratio of Zr/(Ni+Co+Mn+Zr)=0.003. D1 in the first powder specimen is 1.7 μm, and D2 is 3.8 μm.

Embodiment 7

Differences from Embodiment 1 are: Mixing the $Ni_{0.88}Co_{0.10}Mn_{0.02}(OH)_2$ precursor, the LiOH, and the $ZrO_2$ at a molar ratio of Li/(Ni+Co+Mn+Zr)=1.03 and a molar ratio of Zr/(Ni+Co+Mn+Zr)=0.003. D1 in the first powder is 1.7 μm, and D2 is 3.7 μm.

Embodiment 8

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 2.0 μm, and D2 is 4.2 μm.

Embodiment 9

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 0.8 μm, and D2 is 2.6 μm.

Embodiment 10

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 1.2 μm, and D2 is 4.7 μm.

Embodiment 11

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 1.4 μm, and D2 is 7.5 μm.

Embodiment 12

Differences from Embodiment 1 are: Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the first powder is 0.6 μm, and D2 is 5.7 μm.

Comparative Embodiment 1

Preparing a $Ni_{0.88}Co_{0.06}Mn_{0.06}(OH)_2$ precursor, and mixing the precursor with LiOH at a molar ratio of Li/(Ni+Co)=1.03. Performing first-time calcination at 840° C. for 20 hours, and then pulverizing, sifting, and rinsing the calcined product in sequence to obtain a first powder. In the process of pulverizing, sifting, and rinsing, the parameters are controlled so that the particle diameter D1 in the first powder specimen is 1.7 μm, and D2 is 3.8 μm.

Comparative Embodiment 2

Preparing a $Ni_{0.88}Co_{0.12}(OH)_2$ precursor, and mixing the precursor with LiOH at a molar ratio of Li/(Ni+Co)=1.03. Performing first-time calcination at 800° C. for 20 hours, and then pulverizing, sifting, and rinsing the calcined product in sequence to obtain a first powder. In the process of pulverizing, sifting, and rinsing, the parameters are controlled so that the particle diameter D1 in the first powder specimen is 0.4 μm, and D2 is 5.6 μm.

Preparing lithium-ion batteries by using the positive electrode materials provided in Embodiments 1 to 12 and Comparative Embodiments 1 to 2 separately. Table 1 shows the performance test results.

TABLE 1

| Embodiments | Co | M | R1 = Co/M | D1 (μm) | D2 (μm) | D2/D1 | 0.2 C capacity (mAh/g) | 8 C rate | Capacity retention rate C when gassing |
|---|---|---|---|---|---|---|---|---|---|
| Embodiment 1 | 12.0% | 0.0% | Infinite | 1.7 | 3.7 | 2.2 | 215.4 | 92% | <25% |
| Embodiment 2 | 11.9% | 0.1% | 119.0 | 1.8 | 3.7 | 2.1 | 213.1 | 87% | 33% |
| Embodiment 3 | 11.7% | 0.3% | 39.0 | 1.7 | 3.8 | 2.2 | 211.2 | 85% | 42% |
| Embodiment 4 | 11.5% | 0.5% | 23.0 | 1.8 | 3.7 | 2.1 | 210.8 | 83% | 47% |
| Embodiment 5 | 11.0% | 1.0% | 11 | 1.7 | 3.7 | 2.2 | 209.6 | 82% | 59% |
| Embodiment 6 | 10.5% | 1.5% | 7.0 | 1.7 | 3.8 | 2.2 | 209.2 | 80% | 72% |
| Embodiment 7 | 10.0% | 2.0% | 5.0 | 1.7 | 3.7 | 2.2 | 208.7 | 78% | 86% |
| Embodiment 8 | 11.7% | 0.3% | 39.0 | 2.0 | 4.2 | 2.1 | 209.2 | 79% | <25% |
| Embodiment 9 | 11.7% | 0.3% | 39.0 | 0.8 | 2.6 | 3.3 | 214.7 | 88% | 49% |
| Embodiment 10 | 11.7% | 0.3% | 39.0 | 1.2 | 4.7 | 3.9 | 213.9 | 87% | 54% |
| Embodiment 11 | 11.7% | 0.3% | 39.0 | 1.4 | 7.5 | 5.4 | 213.5 | 85% | 68% |
| Embodiment 12 | 11.7% | 0.3% | 39.0 | 0.6 | 5.7 | 9.5 | 216.9 | 92% | 82% |
| Comparative Embodiment 1 | 6% | 6.0% | 1.0 | 1.7 | 3.8 | 2.2 | 207.1 | 70% | 94% |
| Comparative Embodiment 2 | 12% | 0.3% | 40.0 | 0.4 | 5.6 | 14.0 | 216.6 | 89% | 93% |

Referring to Table 1, as can be seen from the comparison data of Embodiments 1 to 7, when the content of Ni is constant and the D2, D1, and D2/D1 are basically constant, with a higher value of R1, the cycle capacity retention rate from which the gassing obviously starts to occur is lower, and therefore, the safety performance of the lithium-ion battery is higher. In addition, with a higher value of R1, the capacity and rate performance of the material are higher. When R1 and D2/D1 are not within the range specified herein, the cycle capacity retention rate from which the gassing obviously starts to occur is excessively high, and the safety performance of the lithium-ion battery is poor.

As can be seen from Embodiments 8 to 12, when the value of R1 is constant, with a lower D2/D1 ratio, the cycle capacity retention rate from which the gassing obviously starts to occur is lower, and the safety performance is higher. However, the D2/D1 ratio needs to avoid being deficient, so as to prevent decline of the capacity and rate performance of the material.

Embodiments 13 to 17 show materials doped with different amounts of Ni and Co

Embodiment 13

Differences from Embodiment 1 are: Mixing the $Ni_{0.96}Co_{0.04}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the specimen is 1.7 μm, and D2 is 3.8 μm.

Embodiment 14

Differences from Embodiment 1 are: Mixing the $Ni_{0.83}Co_{0.17}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the specimen is 1.7 μm, and D2 is 3.8 μm.

Embodiment 15

Differences from Embodiment 1 are: Mixing the $Ni_{0.70}Co_{0.3}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the specimen is 1.8 μm, and D2 is 3.7 μm.

Embodiment 16

Differences from Embodiment 1 are: Mixing the $Ni_{0.60}Co_{0.40}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the specimen is 1.7 μm, and D2 is 3.6 μm.

Embodiment 17

Differences from Embodiment 1 are: Mixing the $Ni_{0.50}Co_{0.50}(OH)_2$ precursor, the LiOH, and the $ZrO_2$ at a molar ratio of Li/(Ni+Co+Zr)=1.03 and a molar ratio of Zr/(Ni+Co+Zr)=0.003. D1 in the specimen is 1.7 μm, and D2 is 3.8 μm.

Preparing lithium-ion batteries by using the positive electrode materials provided in Embodiments 13 to 17 separately. Table 2 shows the performance test results.

TABLE 2

| Embodiment | Ni | Co | M | R1 = Co/M | D1 (μm) | D2 (μm) | D2/D1 | 0.2 C capacity | 8 C rate | Capacity retention rate C when gassing |
|---|---|---|---|---|---|---|---|---|---|---|
| Embodiment 3 | 88% | 11.7% | 0.3% | 39.0 | 1.7 | 3.8 | 2.2 | 211.2 | 85% | 42% |
| Embodiment 13 | 96% | 3.7% | 0.30% | 12.3 | 1.7 | 3.8 | 2.2 | 217.6 | 75% | 65% |
| Embodiment 14 | 83% | 16.7% | 0.30% | 55.7 | 1.7 | 3.8 | 2.2 | 206.3 | 94% | 77% |
| Embodiment 15 | 70% | 29.7% | 0.30% | 99.0 | 1.8 | 3.7 | 2.1 | 175.2 | 96% | 81% |
| Embodiment 16 | 60% | 39.7% | 0.30% | 132.3 | 1.7 | 3.6 | 2.1 | 167.7 | 96% | 85% |
| Embodiment 17 | 50% | 49.7% | 0.30% | 165.7 | 1.7 | 3.8 | 2.2 | 161.4 | 98% | 88% |

As can be seen from the data of Embodiment 3 and Embodiments 13 to 17 in Table 2, when Co/M and D2/D1 satisfy the ranges specified herein, if the content of Ni is higher, the capacity retention rate from which the gassing obviously starts to occur is lower. However, if the content of Ni is excessive, the rate performance will decline rapidly, and the temperature will increase significantly.

Embodiments 18 to 21 show several materials containing coating elements

Embodiment 18

Mixing the $Ni_{0.88}Co_{0.12}(OH)_2$ precursor, the LiOH, and the $ZrO_2$ at a molar ratio of Li/(Ni+Co+Zr)=1.03 and a molar ratio of Zr/(Ni+Co+Zr)=0.003. Performing first-time calcination at 840° C. for 20 hours, and pulverizing, sifting, and rinsing the calcined product in sequence to obtain an intermediate powder.

Subsequently, mixing the obtained intermediate powder with $Al_2O_3$ at a molar ratio of Al/(Ni+Co+Zr)=0.001. Performing second-time calcination at 600° C. for 10 hours to obtain a first powder, in which D1 is 1.8 μm, and D2 is 3.7 μm.

Embodiment 19

Differences from Embodiment 18 are: Mixing the obtained intermediate powder with $Al_2O_3$ at a molar ratio of Al/(Ni+Co+Zr)=0.003. D1 in the first powder is 1.7 μm, and D2 is 3.8 μm.

Embodiment 20

Differences from Embodiment 18 are: Mixing the $Ni_{0.88}Co_{0.12}(OH)_2$ precursor, the LiOH, the $ZrO_2$, and $Al_2O_3$ at molar ratios of Li/(Ni+Co)=1.03, Zr/(Ni+Co+Zr+Al)=0.001, and Al/(Ni+Co+Zr+Al)=0.002.

Mixing the obtained intermediate powder with $Al_2O_3$ at a molar ratio of Al/(Ni+Co+Zr+Al)=0.003. D1 in the first powder is 1.8 μm, and D2 is 3.8 μm.

Embodiment 21

Differences from Embodiment 18 are: Mixing the obtained intermediate powder with $H_3BO_3$ at a molar ratio of B/(Ni+Co+Zr)=0.003, and performing second-time calcination at 300° C. for 10 hours. D1 in the first powder is 1.7 μm, and D2 is 3.8 μm.

Preparing lithium-ion batteries by using the positive electrode materials provided in Embodiments 18 to 21 separately. Table 3 shows the performance test results.

Step 2: Preparing a $Ni_{0.88}Co_{0.07}Mn_{0.05}(OH)_2$ precursor in which the $D_{v50}$ is 8 to 9 μm; mixing the precursor with LiOH and $ZrO_2$ at a molar ratio of Li/(Ni+Co+Mn+Zr)=1.03 and a molar ratio of Zr/(Ni+Co+Mn+Zr) 0.003. Performing first-time calcination at 780° C. for 20 hours, and then pulverizing, sifting, and rinsing the calcined product in sequence to obtain a second powder specimen. In the process of pulverizing, sifting, and rinsing, the parameters are controlled so that D3 in the second powder specimen is 0.6 μm, and D4 is 11.1 μm.

Step 3: Mixing the first powder and the second powder at a mass ratio of 5:5.

Embodiment 23

Differences from Embodiment 22 are: Mixing the $Ni_{0.88}Co_{0.07}Mn_{0.05}(OH)_2$ precursor in which the $D_{v50}$ is 12 to 13 μm, the LiOH, and the $ZrO_2$ at a molar ratio of Li/(Ni+Co+Mn+Zr)=1.03 and a molar ratio of Zr/(Ni+Co+Mn+Zr)=0.003. D3 in the resulting second powder specimen is 0.8 μm, and D4 is 15.6 μm.

Embodiment 24

Differences from Embodiment 22 are: Mixing the $Ni_{0.88}Co_{0.07}Mn_{0.05}(OH)_2$ precursor in which the $D_{v50}$ is 7 to 8 μm, the LiOH, and the $ZrO_2$ at a molar ratio of Li/(Ni+Co+Mn+Zr)=1.03 and a molar ratio of Zr/(Ni+Co+Mn+Zr)=0.003, D3 in the resulting second powder specimen is 0.3 μm, and D4 is 9.7 μm.

Embodiment 25

Differences from Embodiment 22 are: Mixing the $Ni_{0.88}Co_{0.10}Mn_{0.02}(OH)_2$ precursor in which the $D_{v50}$ is 8 to 9 μm, the LiOH, and the $ZrO_2$ at a molar ratio of Li/(Ni+Co+Mn+Zr)=1.03 and a molar ratio of Zr/(Ni+Co+Mn+Zr)=0.003, D3 in the resulting second powder specimen is 0.6 μm, and D4 is 11.2 μm.

TABLE 3

| Embodiments | Ni | Co | M | R1 = Co/M | Coating element | Coating amount | D1 (μm) | D2 (μm) | D2/D1 | 0.2 C capacity | 8 C rate | Capacity retention rate C when gassing |
|---|---|---|---|---|---|---|---|---|---|---|---|---|
| Embodiment 18 | 88% | 11.7% | 0.40% | 29.3 | Al | 0.10% | 1.8 | 3.7 | 2.1 | 209.2 | 89% | 38% |
| Embodiment 19 | 88% | 11.7% | 0.60% | 19.5 | Al | 0.30% | 1.7 | 3.8 | 2.2 | 207.8 | 87% | 35% |
| Embodiment 20 | 88% | 11.7% | 0.60% | 19.5 | Al | 0.30% | 1.8 | 3.8 | 2.1 | 208.7 | 92% | 33% |
| Embodiment 21 | 88% | 11.7% | 0.60% | 19.5 | B | 0.30% | 1.7 | 3.8 | 2.2 | 210.4 | 80% | 52% |

As can be seen from the comparative data of Embodiments 18 to 21 in Table 3, by coating the first secondary particles in the first powder with a specified element and adjusting the coating amount of the coating element, the capacity retention rate from which the gassing obviously starts to occur can be further reduced, and in turn, the safety performance of the lithium-ion battery is improved.

In Embodiments 22 to 33, the material in Embodiment 3 is used as a first powder, and then mixed with a second powder to obtain a positive electrode material. The preparation method and mixing ratio of the second powder are described below.

Embodiment 22

Step 1: Making the specimen prepared in Embodiment 3 ready as a first powder.

Embodiment 26

Differences from Embodiment 22 are: Mixing the $Ni_{0.80}Co_{0.12}Mn_{0.08}(OH)_2$ precursor in which the $D_{v50}$ is 8 to 9 μm, the LiOH, and the $ZrO_2$ at a molar ratio of Li/(Ni+Co+Mn+Zr)=1.03 and a molar ratio of Zr/(Ni+Co+Mn+Zr)=0.003; and performing first-time calcination at 800° C. for 20 hours. D3 in the resulting second powder specimen is 0.6 μm, and D4 is 11.1 μm.

Embodiment 27

Differences from Embodiment 22 are: Mixing the $Ni_{0.60}Co_{0.10}Mn_{0.30}(OH)_2$ precursor in which the $D_{v50}$ is 8 to 9 μm, the LiOH, and the $ZrO_2$ at a molar ratio of Li/(Ni+Co+Mn+Zr)=1.03 and a molar ratio of Zr/(Ni+Co+Mn+Zr)

=0,003; and performing first-time calcination at 850° C. for 20 hours. D3 in the resulting second powder specimen is 0.6 μm, and D4 is 10.9 μm.

Embodiment 28

Differences from Embodiment 22 are: Mixing the $Ni_{0.50}Co_{0.20}Mn_{0.30}(OH)_2$ precursor in which the $D_{v50}$ is 8 to 9 μm, the LiOH, and the $ZrO_2$ at a molar ratio of Li/(Ni+Co+Mn+Zr)=1.03 and a molar ratio of Zr/(Ni+Co+Mn+Zr)=0.003; and performing first-time calcination at 860° C. for 20 hours. D3 in the resulting second powder specimen is 0.6 μm, and D4 is 11.2 μm.

Embodiment 29

Differences from Embodiment 22 are: Mixing the $Ni_{0.88}Co_{0.07}Mn_{0.05}(OH)_2$ precursor in which the $D_{v50}$ is 8 to 9 μm, the LiOH, and the $ZrO_2$ at a molar ratio of Li/(Ni+Co+Mn+Zr)=1.03 and a molar ratio of Zr/(Ni+Co+Mn+Zr)=0.003; and performing first-time calcination at 860° C. for 20 hours, and pulverizing, sifting, and rinsing the calcined product in sequence to obtain an intermediate powder. Subsequently, mixing the obtained intermediate powder with $H_3BO_3$ at a molar ratio of B/(Ni+Co+Mn)=0.003. Performing second-time calcination at 300° C. for 10 hours to obtain a second powder with a coating layer. D3 in the obtained second powder is 0.6 μm, and D4 is 11.2 μm.

Embodiment 30

Differences from Embodiment 22 are: Mixing the obtained intermediate powder with $H_3BO_3$ and $Al_2O_3$ at a molar ratio of B/(Ni+Co+Mn+Zr)=0.0015, and a molar ratio of Al/(Ni+Co+Mn+Zr)=0.0015, and performing second-time calcination at 500° C. for 10 hours to obtain a second powder with a coating layer. D3 in the obtained second powder is 0.6 μm, and D4 is 11.1 μm.

Embodiment 31

Different from Embodiment 22 in: mixing the first powder and the second powder at a ratio of 3:7.

Embodiment 32

Different from Embodiment 22 in: mixing the first powder and the second powder at a ratio of 2:8.

Embodiment 33

Different from Embodiment 22 in: mixing the first powder and the second powder at a ratio of 1:9.

Table 4 shows the specific parameters of the second powder in Embodiments 22 to 33. Preparing lithium-ion batteries by using the positive electrode materials provided in Embodiments 22 to 33 separately. Table 5 shows the performance test results.

TABLE 4

| Embodiment | Weight percent of second powder | Ni | Co | M | R2 = Co/M | Coating element | Coating amount | D3 (μm) | D4 (μm) | D4/D3 |
|---|---|---|---|---|---|---|---|---|---|---|
| Embodiment 19 | 53% | 88% | 7% | 5% | 1.4 | / | / | 0.6 | 11.1 | 19 |
| Embodiment 20 | 53% | 88% | 7% | 5% | 1.4 | / | / | 0.8 | 15.6 | 20 |
| Embodiment 21 | 55% | 88% | 7% | 5% | 1.4 | / | / | 0.3 | 9.7 | 32 |
| Embodiment 22 | 54% | 88% | 10% | 2% | 5.0 | / | / | 0.6 | 11.2 | 19 |
| Embodiment 23 | 54% | 80% | 12% | 8% | 1.5 | / | / | 0.6 | 11.1 | 19 |
| Embodiment 24 | 53% | 60% | 10% | 30% | 0.3 | / | / | 0.6 | 10.9 | 18 |
| Embodiment 25 | 53% | 50% | 20% | 30% | 0.7 | / | / | 0.6 | 11.2 | 19 |
| Embodiment 26 | 55% | 88% | 7% | 5.3% | 1.3 | B | 0.30% | 0.6 | 11.2 | 19 |
| Embodiment 27 | 55% | 88% | 7% | 5.3% | 1.3 | B + Al | 0.30% | 0.6 | 11.1 | 19 |
| Embodiment 28 | 36% | 88% | 7% | 5% | 1.4 | / | / | 0.6 | 10.0 | 17 |
| Embodiment 29 | 27% | 88% | 7% | 5% | 1.4 | / | / | 0.6 | 10.0 | 17 |
| Embodiment 30 | 16% | 88% | 7% | 5% | 1.4 | / | / | 0.6 | 10.0 | 17 |

TABLE 5

| Embodiment | 0.2 C capacity | 8 C rate | $500^{th}$-cycle capacity retention rate | Capacity retention rate C when gassing |
|---|---|---|---|---|
| Embodiment 3 | 211.2 | 85% | 71% | 42% |
| Embodiment 19 | 214.3 | 88% | 84% | 69% |
| Embodiment 20 | 215.1 | 89% | 88% | 75% |
| Embodiment 21 | 216.8 | 92% | 77% | 67% |
| Embodiment 22 | 218.5 | 96% | 72% | 64% |
| Embodiment 23 | 212.4 | 97% | 86% | 70% |
| Embodiment 24 | 176.9 | 96% | 92% | 85% |
| Embodiment 25 | 168.4 | 98% | 96% | 88% |
| Embodiment 26 | 216.7 | 78% | 82% | 67% |
| Embodiment 27 | 214.9 | 84% | 87% | 74% |
| Embodiment 28 | 215.7 | 87% | 82% | 65% |
| Embodiment 29 | 216.2 | 88% | 84% | 70% |
| Embodiment 30 | 216.4 | 90% | 85% | 80% |

As can be seen from the data in Table 5, in contrast to Embodiment 3, the capacity retention rate from which the gassing obviously begins to occur Embodiments 22 to 33 is higher, the safety is slightly lower, but the capacity and rate performance are significantly improved.

As can be seen from relevant data of some embodiments of this application, when the positive electrode material obtained under the conditions specified herein is used in a lithium-ion battery, the lithium-ion battery can achieve higher safety and rate performance on the basis of maintaining a relatively high capacity.

This application has been disclosed above with reference to exemplary embodiments, but the exemplary embodiments are not intended to limit the claims. Any person skilled in the art may make various variations and modifications to this application without departing from the conception of this application. Therefore, the protection scope of this application is subject to the claims hereof.

What is claimed is:

1. A positive electrode material, wherein the positive electrode material comprises a first powder, the first powder comprises first secondary particles, the first secondary particles comprises at least two first primary particles; an average particle diameter D1 of the first primary particles is 500 nm to 3 μm, an average particle diameter D2 of the first secondary particles is 2 μm to 8 μm; and 2≤K1≤10, K1 being a ratio of D2 to D1;

the first powder comprises $Li_{n1}Ni_{x1}Co_{y1}M_{z1}O_{2\pm m1}$, where n1, x1, y1, and z1 respectively represent molar contents of Li, Ni, Co, and M, and m1 is a molar content parameter representing oxygen deviation; and the metal element M comprises at least one of W, La, or Ce;

wherein a molar ratio R1 of Co to M is greater than or equal to 6.

2. The positive electrode material according to claim 1, wherein 11≤R1≤500.

3. The positive electrode material according to claim 1, wherein the first powder further comprise elements Li and Ni, a molar content of the element Li is $n_{Li}$, a molar content of the element Ni is $n_{Ni}$, a molar content of the element Co is $n_{Co}$, a molar content of the element M is $n_M$, a sum of the molar content of the elements Ni, Co, M is $n_{Ni+Co+M}$, and at least one of the following conditions is satisfied: (1) a ratio of $n_{Li}$ to $n_{Ni+Co+M}$ is 0.85≤n1 <1.1; (2) a ratio of $n_{Li}$ to $n_{Ni+Co+M}$ is 0.5≤x1<1; (3) a ratio of $n_{Co}$ to $n_{Ni+Co+M}$ is 0.01≤y1<0.5; and (4) a ratio of $n_M$ to $n_{Ni+Co+M}$ is 0≤z1≤0.02.

4. The positive electrode material according to claim 3, wherein in $Li_{n1}Ni_{x1}Co_{y1}M_{z1}O_{2\pm m1}$, 0.85≤n1<1.1, 0.5≤x1<1, 0.01≤y1<0.5, 0≤z1≤0.02, x1+y1+z1=1, and 0≤m1≤0.1.

5. The positive electrode material according to claim 1, wherein the metal element M comprises A1.

6. The positive electrode material according to claim 1, wherein the metal element M comprises Mn.

7. The positive electrode material according to claim 1, wherein a surface of a first secondary particle contains a coating layer, the coating layer comprises an element Z, and the element Z comprises at least one of A1, W, Ti, Zr, B, P, or F; and a molar ratio of the element Z and a transition metal element in the first powder is less than or equal to 0.5%.

8. The positive electrode material according to claim 1, wherein the positive electrode material comprises a second powder, the second powder comprises second secondary particles, the second secondary particle comprises at least two second primary particles, an average particle diameter D3 of the second primary particles is 300 nm to 800 nm, an average particle diameter D4 of the second secondary particles is 8 μm to 15 μm; and 15≤K2≤30, K2 being a ratio of D4 to D3.

9. The positive electrode material according to claim 8, wherein the second powder comprises an element Co and a metal element M, and the metal element M comprises at least one of Mn, A1, W, Ti, Zr, Mg, La, Y, Sr, or Ce; wherein a molar ratio R2 between the element Co and the metal element M in the second powder satisfies: 0.1≤R2≤5.

10. The positive electrode material according to claim 9, wherein the second powder further comprise elements Li and Ni, a molar content of the element Li is $n_{Li}$, a molar content of the element Ni is $n_{Ni}$, a molar content of the element Co is $n_{Co}$, a molar content of the element M is $n_M$, a sum of the molar content of the elements Ni, Co, M is $n_{Ni+Co+M}$, and at least one of the following conditions is satisfied: (a) a ratio of $n_{Li}$ to $n_{Ni+Co+M}$ is 0.85≤n2<1.1; (b) a ratio of $n_{Ni}$ to $n_{Ni+Co+M}$ is 0.5≤x2<1; (c) a ratio of $n_{Co}$ to $n_{Ni+Co+M}$ is 0.01≤y2≤0.49; and (d) a ratio of $n_M$ to $n_{Ni+Co+M}$ is 0.01≤z2≤0.05.

11. The positive electrode material according to claim 10, wherein the second powder comprises $Li_{n2}Ni_{x2}Co_{y2}M_{z2}O_{2\pm m2}$, wherein 0.85≤n2<1.1, 0.5≤x2<1, 0.01≤y2≤0.49, 0.01≤z2≤0.02, x2+y2+z2=1, and 0≤m2≤0.1.

12. The positive electrode material according to claim 8, wherein the second powder comprises at least one of B or A1, wherein a ratio of a total molar weight of B and A1 to a molar weight of a transition metal element in the second powder is 0.1% to 0.5%.

13. The positive electrode material according to claim 8, wherein a weight of the first powder is 15% to 60% of a total weight of the first powder and the second powder.

14. An electrochemical device, comprising a positive electrode material, wherein the positive electrode material comprises a first powder, the first powder comprises first secondary particles, the first secondary particles comprises at least two first primary particles; an average particle diameter D1 of the first primary particles is 500 nm to 3 μm, an average particle diameter D2 of the first secondary particles is 2 μm to 8 μm; and 2≤K1≤10, K1 being a ratio of D2 to D1;

the first powder comprises $Li_{n1}Ni_{x1}Co_{y1}M_{z1}O_{2\pm m1}$, where n1, x1, y1, and z1 respectively represent molar contents of Li, Ni, Co, and M, and m1 is a molar content parameter representing oxygen deviation; and the metal element M comprises at least one of W, La, or Ce;

wherein a molar ratio R1 of Co to M is greater than or equal to 6.

15. The electrochemical device according to claim 14, wherein 11≤R1≤500.

16. An electrical device, characterized in that, the electrical device comprises the electrochemical device according to claim 14.

* * * * *